March 6, 1962  W. W. ALLEN ET AL  3,023,668
PORTABLE SLIDE PROJECTOR
Filed Feb. 21, 1957  4 Sheets-Sheet 1
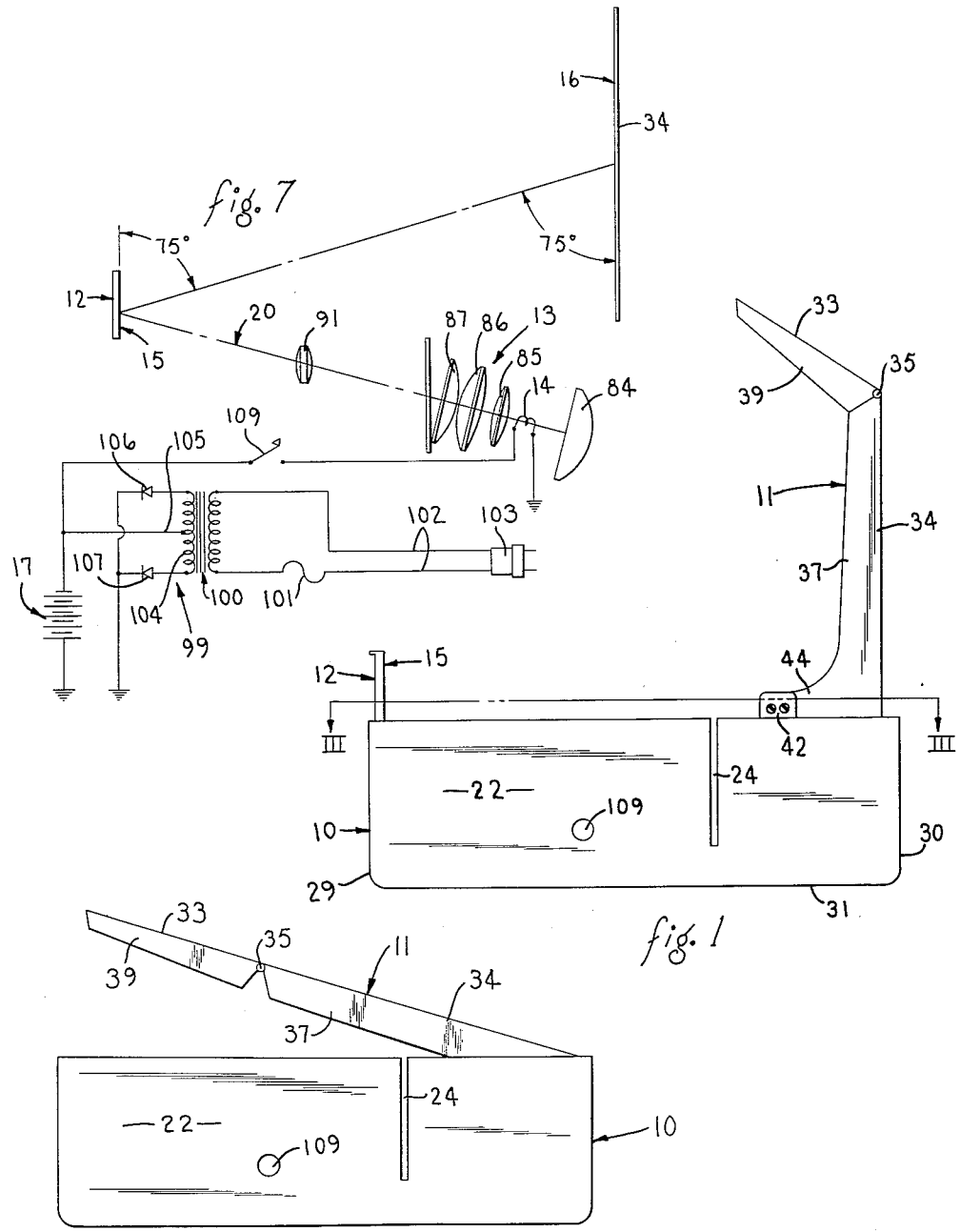
INVENTORS
WADE W. ALLEN
ATHOL A. KELLEY
BY
ATTORNEY

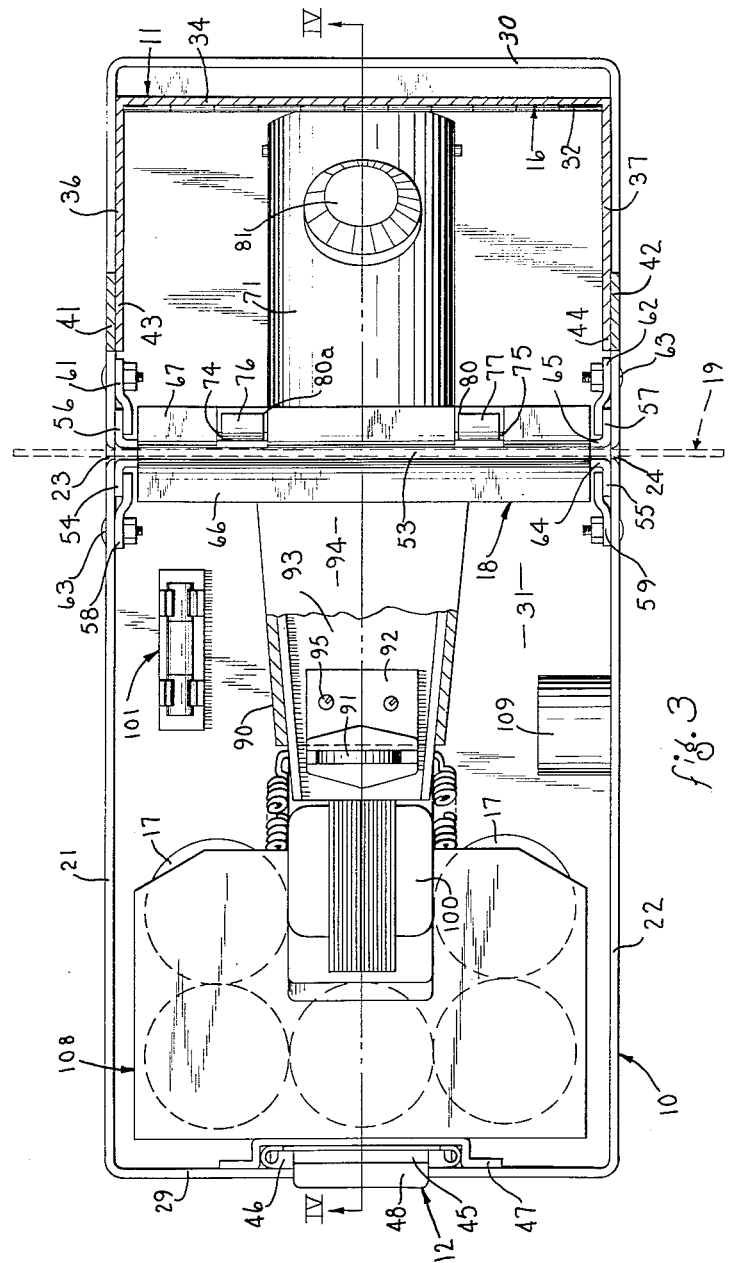

March 6, 1962   W. W. ALLEN ET AL   3,023,668
PORTABLE SLIDE PROJECTOR
Filed Feb. 21, 1957   4 Sheets-Sheet 3
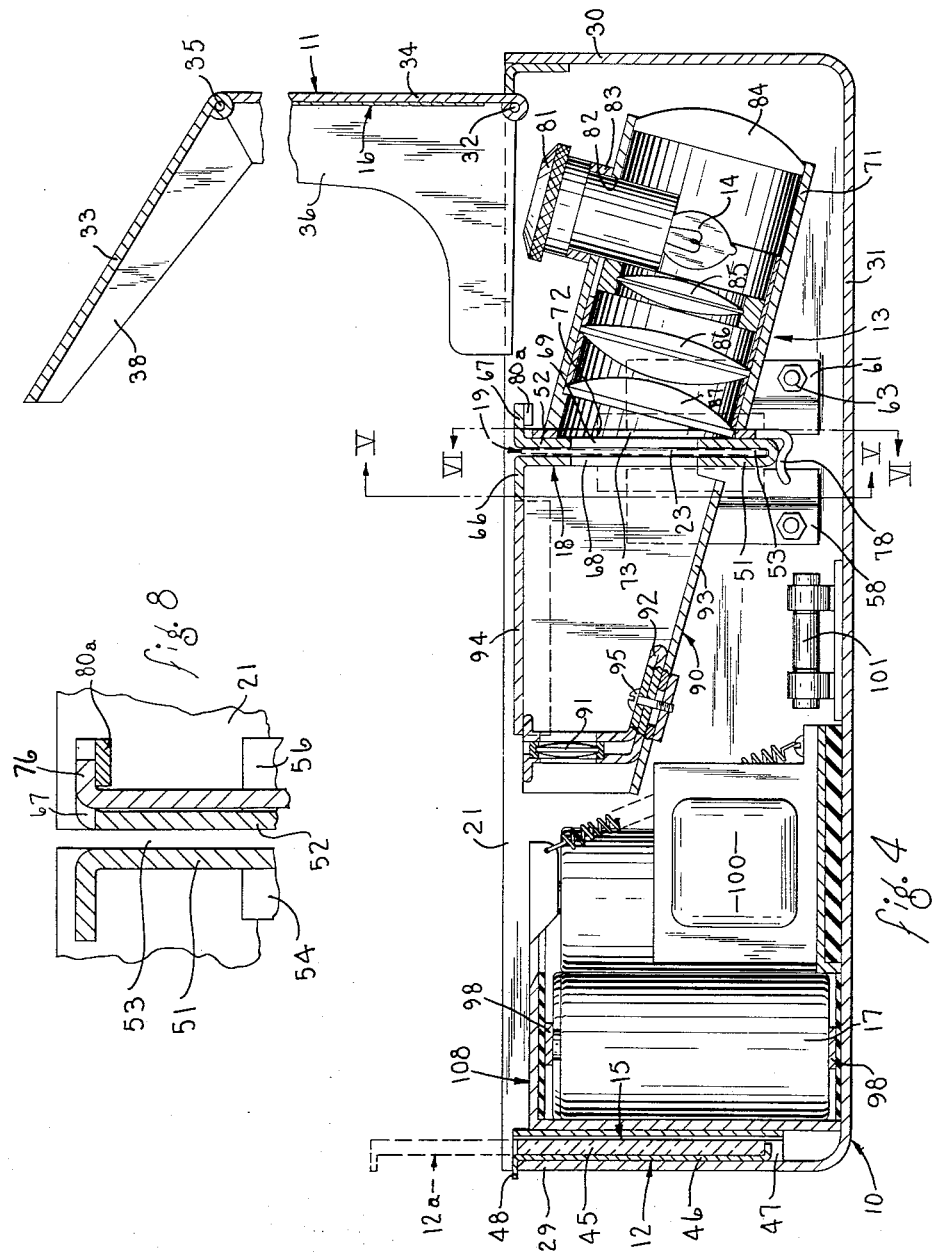
INVENTORS
WADE W. ALLEN
ATHOL A. KELLEY
BY
ATTORNEY

United States Patent Office 3,023,668
Patented Mar. 6, 1962

3,023,668
PORTABLE SLIDE PROJECTOR
Wade W. Allen and Athol A. Kelley, Kalamazoo, Mich., assignors to The Upjohn Company, Kalamazoo, Mich., a corporation of Michigan
Filed Feb. 21, 1957, Ser. No. 641,625
6 Claims. (Cl. 88—24)

This device relates in general to a transparency slide projector and particularly to a type thereof which is small and portable and arranged for operation either from self-contained batteries or from an external commercial source.

It has long been recognized that the use of pictures is highly effective in conveying sales information. Pictures provide not only an appealing method of presentation but also a practical and convenient method in that they permit the salesman to show products or demonstrate techniques to his customers which would be difficult or impossible otherwise. It has also been long recognized that colored transparencies provide effective pictures for such use, and the objectives which can be accomplished in this manner are of great importance in selling.

However, there has never been available, insofar as we are aware, any projector capable of operation either from a relatively small battery source, such as provided by a dry cell, or from a commercial A.C. source, and which is further completely adaptable for use by salesmen under the wide variety of conditions necessarily encountered while selling a product.

Particularly, it is necessary that such a projector, in addition to being alternatively operable either by self-contained batteries or from a commercial A.C. source, be sufficiently small that it can be readily carried by a salesman in a briefcase or dispatch bag of conventional size. It is essential that the picture projected will be large enough to be readily seen by the person with whom the salesman is discussing his product, that the projector will operate conveniently with transparencies of standard 35 millimeter size, or similar, that the projected picture can be seen with substantially equal clarity from any of several angles in order to accommodate the situation where a salesman may be talking to a group of people, that the picture be of sufficient brightness that it can be readily seen in the ambient light normally encountered in the average office or home, and that the electrical system will include storage batteries which are not only capable of continuous service throughout a two or three hour interview but that the batteries will also be capable of ready restoration as required. Thus, it will be seen that tthe provision of a viewer of this type presents numerous problems which, in spite of the obvious and recognized need for such a viewer, have previous to our invention, prevented the successful design of a completely portable viewer of this character.

Accordingly, a principal object of the invention has been to provide a transparency slide projector of sufficiently small and portable size and character as to be readily capable of being carried in a briefcase, dispatch case or overcoat pocket.

A further object of the invention has been to provide a transparency slide projector of the nature aforesaid which is capable of operation either from a 110 volt A.C. source or from self-contained batteries, and capable of operating from said batteries for a period of at least two or three hours.

A further object of the invention has been to provide a projector, as aforesaid, which will provide a picture sufficiently large and bright as to be readily seen at a distance of three to eight feet and under the ambient light conditions ordinarily encountered in a home or office.

A further object of the invention has been to provide a projector, as aforesaid, which will operate readily with transparencies of 35 millimeter size or other sizes of this general order, and in which the transparencies may be readily and rapidly inserted and removed.

A further object of the invention has been to provide a projector, as aforesaid, the screen of which can be viewed at a relatively low angle with respect to the plane of the screen, thereby providing a wide angle of visibility.

A further object of the invention has been to provide a projector, as aforesaid, which will operate either from a battery source or from an A.C. source depending solely on whether or not it is connected to an A.C. source.

A further object of the invention has been to provide a projector, as aforesaid, which will resist rough handling, which can be held in any position, which will have a strong mechanical construction so that it can be carried in a satchel with miscellaneous other articles, such as product samples, without injury and which will be ready for immediate use even after such rough treatment.

A further object of the invention has been to provide a projector, as aforesaid, which will require no replacement parts under normal conditions of use other than the inexpensive, electric lamp which provides the light source and can be readily obtained practically anywhere.

Other objects and purposes of the invention will be apparent to persons acquainted with devices of this general type upon a reading of the following disclosure and inspection of the accompanying drawings, in which:

FIGURE 1 is a side elevational view of the slide projector, to which this invention relates, in the operating or open position.

FIGURE 2 is a side elevational view of said projector in the partially closed position.

FIGURE 3 is a sectional view taken along the line III—III of FIGURE 1.

FIGURE 4 is a broken, sectional view taken along the line IV—IV of FIGURE 3.

FIGURE 7 is a diagrammatic illustration of a preferred electrical circuit and the essential elements associated with the light path projected through the slide and onto the screen of the projector.

FIGURE 8 is a sectional view along line VIII—VIII of FIGURE 6.

Figure 5:
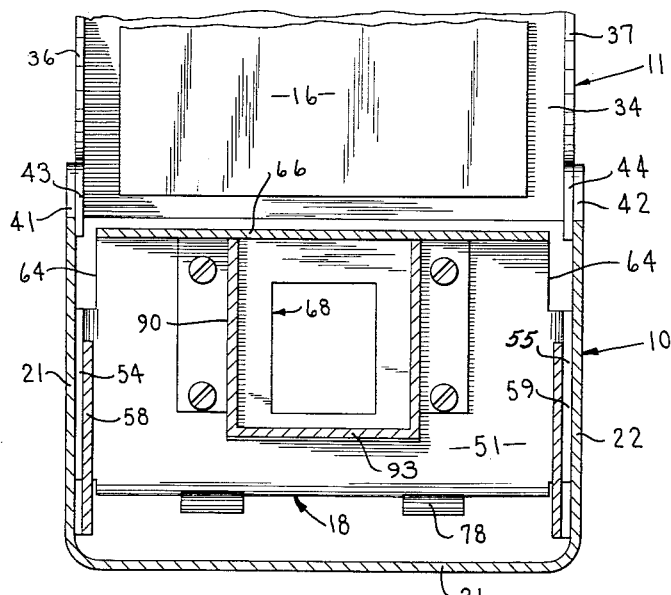
FIGURE 5 is a sectional view taken along the line V—V of FIGURE 4.

For the purpose of convenience in description, the terms "upper," "lower," and derivatives thereof, will have reference to the projector and parts thereof in normal operating positions, as appearing in FIGURE 1. The terms "front," "rear," and derivatives thereof, will have reference to directions toward and away from that end of the projector from which the projector screen is normally viewed, which is the leftward end as appearing in FIGURES 1 and 2. The terms "left," "right," and derivatives thereof, will have reference to the projector as appearing to a person viewing the projector screen from the front end thereof.

Similarly, the terms "vertical" and "horizontal," and derivatives thereof, and other words importing position, will be freely used for convenience in reference and will be understood to refer to the device as shown and in its position of normal use. However, the use of such terminology shall not imply that the viewer cannot be used in other positions nor shall it imply that the principles of the invention as hereinafter defined cannot be employed in modified devices having other and differing positions of normal use.

*General Description*

In order to meet the objects and purposes set forth above, as well as others related thereto, there has been provided a completely portable slide projector, as shown in FIGURES 1, 2, 3 and 4, comprised of an elongated, substantially rectangular housing or container 10, having a top 11 hinged at one end thereof at or near one end of said housing for movement between a substantially horizontal or closed position and a substantially upright or open position. A flat reflective member 12, such as a mirror, is vertically slidably supported upon, and within, the other end of said housing for movement into, and out of, an elevated position. An optical system 13 is provided within the housing 10 for directing illumination from a source 14 onto the inner, reflective surface 15 of the reflective plate 12 when in said elevated position. The optical system 13, source 14 and the reflective surface 15 are all so arranged that said illumination is reflected by the surface 15 and properly focused onto a screen 16 provided on the inner surface of the housing top 11. The light source 14 is energized by a suitable constant potential source, such as the storage batteries 17 disposed within the housing 10. A slide guide 18 is located within the housing 10 for holding a transparency 19 across the path 20 of illumination being directed from the light source 14 by the optical system 13 onto the reflective surface 15. The side walls 21 and 22 of the housing 10 are provided with slots 23 and 24, respectively, adjacent to the slide guide 18 and through which a transparency 19 may be inserted into said slide guide.

*Detailed Construction*

As best shown in FIGURES 3 and 4, the housing 10 has, in addition to the side walls 21 and 22, a front end wall 29, a rear end wall 30, and a bottom wall 31. These side, end and bottom walls may be fabricated from any reasonably durable and stiff material, such as sheet metal, and may be shaped or otherwise connected together in any convenient, conventional manner. The top 11 is supported along its rearward edge by means of the hinge 32 upon the rear end wall 30, and is comprised of upper and lower, articulated, flanged panels 33 and 34 (FIGURES 1 and 4), which are connected together by means of the hinge 35, having an axis substantially parallel with the axis of the hinge 32. The flanges 36 and 37 on the lower panel 34, and the flanges 38 and 39 on the upper panel 33, combine with the upper panel 33 to provide a frontwardly extending hood, which tends to shield a substantial amount of ambient light away from the screen 16 mounted upon the inward side of the lower panel 34.

The lower flanges 36 and 37 (FIGURES 1 and 4) have forwardly extending, integral arms 43 and 44 near their lower ends. A pair of stops 41 and 42 (FIGURES 1 and 5) are secured to, and extend sidewardly from, the forward ends of said arms 43 and 44, respectively, for the purpose of engaging the upper edges of the side walls 21 and 22, when said top 11 is in its upright position, as appearing in FIGURES 1 and 5, and thereby preventing an accidental, unexpected pivoting of the top 11 out of its upright position. However, a desired movement of said top 11 into the closed position (FIGURE 6) can be easily effected simply by moving the free ends of said flange arms 43 and 44 toward each other before moving the top 11 downwardly about the axis of the hinge 32. The engagement between the flanges 38 and 39 on the upper panel 33, and the flanges 36 and 37 on the lower panel 34, determine the position of the upper panel 33 with respect to said lower panel 34 when said top 11 is in its upright position. The flanges 36, 37, 38 and 39, and the flange arms 43 and 44, are disposed within the housing 10 adjacent to the side walls 21 and 22, respectively, when said top 11 is in its substantially horizontal or closed position.

The reflective member 12 (FIGURES 3 and 4) is, in this particular embodiment, comprised of a mirror 45 mounted within a frame 46, which is vertically slidably disposed between the front wall 29 and the bracket 47 secured to the inner surface thereof. Said frame 46 is provided with a frontwardly extending flange 48 along its upper edge, whereby said reflective member 12 may be manually raised from its lower, solid line position to its upper, broken line position 12a, as appearing in FIGURE 4. The mirror 45 is arranged so that its reflective surface 15 is substantially parallel with, and opposed to, the screen 16 when said member 12 is in its raised position and said top 11 is in its upright position.

As shown in FIGURES 3, 4, 5 and 6, the slide guide 18 for the transparencies 19 is comprised of parallel, spaced, front and rear guide plates 51 and 52, which are connected together at their lower edges to form a laterally and vertically elongated channel 53 which is disposed transversely of the housing 10 and is spaced upwardly from the bottom wall 31 of said housing. The plates 51 and 52 have oppositely extending flanges 54 and 55, and 56 and 57, respectively, (FIGURE 3) along their lateral edges, which flanges are disposed parallel with, and adjacent to, the side walls 21 and 22, respectively. The flanges 54, 55, 56 and 57 are held against said side walls, thereby securing the slide guide 18 in position, by means of the clips 58, 59, 61 and 62, respectively, said clips being removably secured to the side walls 21 and 22 by means of nut and bolt combinations 63. The slots 23 and 24 in said side walls 21 and 22, respectively, are aligned with the channel 53 when the slide guide 18 is mounted within the housing 10 by means of said clips 58, 59, 61 and 62.

Figure 6:
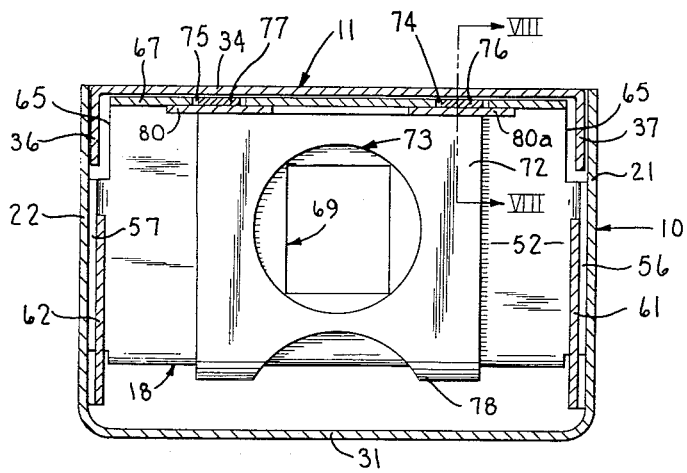
FIGURE 6 is a sectional view taken along the line VI—VI of FIGURE 4, but with the cover closed.

As shown in FIGURES 5 and 6, the plates 51 and 52 are notched at 64 and 65, respectively, near their upper edges, adjacent to the side walls 21 and 22, to avoid the flanges 36 and 37 of the lower panel 34 when the top 11 is lowered into its horizontal position. The upper edges of the plates 51 and 52 have oppositely extending, substantially horizontal flanges 66 and 67 for strength purposes. Said plates 51 and 52 are provided with aligned, substantially similar, rectangular openings 68 and 69, respectively, which outline the transparencies 19 placed within the slide guide 18.

A rectangular support plate 72 (FIGURE 4) is provided adjacent to, and parallel with, the rear surface of the slide guide 18 for supporting the forward (leftward as appearing in FIGURE 4) end of the optics cylinder 71. The support plate 72 contains a circular opening 73 aligned with the adjacent end of the cylinder 71 and substantially capable of circumscribing the opening 69 in the rear plate 52 of the slide guide 18. The flange 67 on the rear sheet 52 is provided with a pair of notches therein and a pair of plates 80 and 80a are secured to the lower surface of flange 67 beneath the notches to define a pair of slots 74 and 75. A pair of springs 76 and 77 on the upper edge of the support plate 72 extend through slots 74 and 75 for support upon said flange 67. A resilient tab 78 on the lower edge of the support plate 72 is arranged to snap under the lower edge of the slide guide 18, thereby removably holding the support plate 72 firmly against the rear sheet 52. When the plate 72 is thusly mounted upon the slide guide 18, the axis of said optics cylinder 71 slopes downwardly and rearwardly along a line which is advantageously arranged at an angle of about 15° with respect to the base 31 of the device. Further, said line when projected forwardly will intersect the reflective surface 15 near the center thereof when said surface 15 is in its upward, extended position.

The light source 14 is preferably an electric lamp removably mounted in a socket 81, which in turn is removably supportable within an appropriate sleeve 83. Said sleeve communicates with an opening 82 in the side wall of the optics cylinder 71 near to, but spaced from, the rearward end thereof. A mirror 84 is mounted within the rearward end of the cylinder 71, with its reflective surface facing forwardly. A plurality, here three, of condenser lenses 85, 86 and 87, which may be identical, are supported at intervals along, and within, the optics cylinder 71 between the lamp 14 and the support plate 72. Thus, illumination radiating from the lamp 14 passes directly, and indirectly as a result of the mirror 84, through said condenser lenses 85, 86 and 87 and the openings 68 and 69 in said slide guide 18.

A light chamber 90, having a substantially rectangular cross-section, is secured to the front surface of the slide guide 18 and extends forwardly therefrom. The rearward end of said light chamber 90, which is substantially larger in cross-sectional area than the frontward end thereof, surrounds the opening 68 in said front plate 51. A projection lens 91 is removably supported in a bracket 92, which is adjustably supported upon the bottom wall 93 of the light chamber 90 near the forward end thereof.

In this particular embodiment, and as shown in FIGURE 7, the plane defined by a transparency 19 within the slide guide 18, the central plane of the projection lens 91, the reflective surface 15 of the reflective member 12, and the screen 16, are all substantially parallel with each other and perpendicular to the bottom wall 31 of the housing 10. It has been found that where the light path 20 engages the reflective surface 15 at an angle of incidence, hence an angle of reflection, of not materially less than 75°, no appreciable distortion occurs in the image projected upon the screen 16. The top wall 94 of the light chamber 90 is easily removable therefrom to provide access to the screws 95, which adjustably secures the bracket 92 to said bottom wall 93, and whereby the focus of the projection lens 91 may be adjusted.

The light source 14 (FIGURE 7), which may be a conventional incandescent lamp, is energized by a source of constant potential, here a storage battery 17 (FIGURE 3), which in this case consists of a group of cells which are located in the front end of the housing 10 and are connected in series circuit with respect to each other, as by means of the connector bars 98 (FIGURE 4). The storage battery 17 is preferably of the rechargeable type, such as those manufactured by Gould National Batteries, Inc., St. Paul, Minnesota, and referred to generally as "nickel cadmium storage batteries." In this particular instance, said battery generates 1.3 volts, thereby producing a maximum voltage output of 6.5 volts from its five cells. Normally these batteries have a rating of 2.5 ampere-hours under the operating conditions just set forth.

Several types of circuits for operating the lamp and/or charging the battery from an external source, including half wave rectifier circuits and bridge constructions, may be utilized but the following represent a preferred form by reason of its accuracy and simplicity. As shown in FIGURE 7, the lamp 14 and the storage batteries 17 are connected in parallel with respect to each other between ground and a charging circuit 99, which latter includes a transformer 100 mounted within the housing 10 near the storage batteries 17. The primary winding of the transformer 100 is connected through a fuse 101 and the leads 102 to an electrical plug 103, which may be inserted into any conventional 110 volt outlet. The secondary winding 104 of said transformer 100 is center tapped by the conductor 105, which is connected both to the storage batteries 17 and to the lamp 14. The end taps on the secondary 104 are connected to rectifiers 106 and 107, respectively, and then to ground. Thus, the storage batteries 17 can provide the normal supply of energy to the lamp 14. However, when the plug 103 is connected to a 110 volt A.C. source, the charging circuit 99 not only serves to recharge the storage batteries 17 by reversing the current flow therethrough, but also provides energy for the lamp 14 in the event that it becomes desirable to continue operation of the projector while the batteries are being recharged.

A switch 109 (FIGURES 1, 3 and 7) is placed in the circuit 99 between the storage batteries 17 and the lamp 14. The switch is resiliently held in the open position and, therefore, must be manually depressed to close. It is to be noted that use of a normally open, spring biased contact switch coupled with a rectifier element of a very high "back" resistance, such as germanium or silicon, simplifies the construction in providing automatic protection against battery discharge through the secondary winding of the transformer. As shown in FIGURE 4, the storage battery 17 may be enclosed by an insulated covering 108, which is easily removed for the purposes of inspecting or replacing the battery 17.

*Operation*

Under normal circumstances, the portable projector to which this invention relates will normally carry its storage battery 17 at all times and, therefore, will be ready for operation at a moment's notice. When not in operation, the top 11 will be arranged with its upper and lower panels 33 and 34, respectively, substantially coplanar, as shown in FIGURE 2, and they will be fully lowered into a substantially horizontal position (FIGURE 6), thereby closing the container 19. With said top 11 in the fully closed position, said portable projector becomes a relatively small, compact article, which can be easily transported.

When it becomes desirable to use the projector, the top 11 is raised into the position shown in FIGURE 1, with the upper panel 33 and the flanges 36, 37, 38 and 39, on the upper and lower panels 33 and 34, respectively, providing a hood for shielding a substantial amount of the ambient light away from the screen 16 on the inner surface of the lower panel 34. The stops 41 and 42 on the arms 43 and 44 of the lower panel 34 rest upon the upper edges of the side walls 21 and 22, thereby preventing accidental pivoting of the top 11 out of its open position, and also providing an exact positioning of the screen 16 for purposes of proper focusing.

The flat, reflective member 12 (FIGURES 3 and 4) is manually engaged by the flange 48 on the frame 46 thereof and raised into the position shown in FIGURES 1 and 4. A transparency 19 (FIGURES 3 and 4) may now be placed in the channel 53 of the slide guide 18 and aligned with the rectangular openings 68 and 69 in the front and rear plates 51 and 52, respectively, of said slide guide 18. When the switch 109 is closed, light passing through the optical system 13 will project an image of the transparency 19 onto said reflective surface 15, from which it is reflected onto the screen 16. Because of the slots 23 and 24 in the side walls 21 and 22, respectively, the transparencies 19 can be slid either sidewise into the channel 53 or vertically from the top thereof, as desired. Because of the relatively small amount of power used by the lamp 14, the intensity of its illumination is correspondingly small. However, in one specific use by salesmen, it has been found advantageous to prepare the transparencies 19 from relatively thin film rather than increase the illumination in order to minimize the drain on the batteries.

The lamp 14 may be energized either from the batteries 17 if the plug 103 is not connected with an A.C source, or from the output of the rectifier circuit where the plug 103 is so connected. This will result automatically and no switching will be required to accommodate the device to the nature of the power source. It will be apparent also that with the plug 103 connected with an A.C. source, the lamp 14 may be energized and the batteries recharged simultaneously.

When use of the projector is completed, it may be made ready for transportation easily and quickly by lowering the reflective member 12 from its broken line position to its solid line position, as shown in FIGURE 4, and then lowering the top 11 from its FIGURE 1 position, through the position shown in FIGURE 2, into the fully closed position.

When it becomes necessary or desirable to recharge the batteries 17, this may be easily accomplished by inserting the plug 103 into any convenient 110 volt outlet, which, as shown in FIGURE 7, passes rectified A.C. current in the reverse, or charging, direction through said storage batteries 17.

The focus of the image on the screen 16 may be easily adjusted by removing the top wall 94 from the light chamber 90 (FIGURE 4), loosening the screws 95, and then sliding the projection lens bracket 92 along the bottom wall 93 until the proper focus is established. The screws 95 are then secured in position and the top wall 94 returned to its closed position. Normally, such adjustment when once made, as at the factory, will need no further attention during the normal use of the device.

In the event that the lamp 14 burns out, it can be easily and quickly replaced simply by removing the lamp socket 81 from the optics cylinder 71 and removing and replacing said lamp 14, after which said socket 81 is returned to its position. The slide guide 18, as well as the optics cylinder 71 and light chamber 90 mounted thereon, may be removed as a unit from the housing 10 for inspection or adjustment by loosening the nut and bolt combinations 63 and then sliding the flanges 54, 55, 56 and 57 of said guide 18 upwardly with respect to the clips 58, 59, 61 and 62, respectively. The storage batteries 17 may be removed from the housing by first raising the battery cover 108, which holds them in position within said housing.

It will, of course, be understood that the selection of a sheet metal structure for the embodiment herein utilized to illustrate the invention is illustrative only and, while preferred, is not limiting. Other materials, such as cast metal, molded or fabricated plastic, or various types of composition materials, may be alternatively employed with structural modifications appropriate to the particualr materials used provided only that the general arrangement and organization of parts above described is maintained. Similarly, it should be understood that focusing may be accomplished by any construction allowing motion of projection lens 91 along the optical path 20 and this invention is not restricted to the particular embodiment illusttrated.

While specific reference has been made above to use of this projector with transparencies of 35 mm. size, it will be understood that the invention is in no sense limited to the size of transparency used and that projectors embodying the invention may readily be designed to be used with transparencies of many other sizes, both standard and special.

It will be recognized that the above described structure can, with little or no modification, be adapted for other, related uses. For example, said projector can easily serve as a viewer for motion picture camera film or as a table-top type home viewer for amateur slides. Thus, although a particular, preferred embodiment of the invention has been disclosed hereinabove for illustrative purposes, it will be understood that variations or modifications thereof, which lie within the scope of such disclosure, are fully contemplated unless specifically stated to the contrary in the appended claims.

We claim:

1. A portable slide projector comprising: a generally rectangular and relatively shallow box; a cover movably supported upon said box and having a screen on the inside thereof, said cover being movable into an upright position adjacent one end of said box so that said cover lies in a plane substantially perpendicular to the longitudinal extent of said box; a mirror located at the other end of said box and movable with respect to said box in a direction substantially transverse to the longitudinal extent of said box into an operating position above and adjacent the top edge of said box at said other end thereof and parallel with said plane of said screen when said cover is in said upright position; a light source within said box near said one end thereof and shielded from said screen; a transparency holder positioned within said box between said light source and said mirror; wall means defining a battery compartment within said box between said transparency holder and said other end of said box; optical means directing a beam from said source through said transparency holder and toward said operating position of said mirror, said light source, said transparency holder and said optical means being entirely received within said box and being arranged so that the axis of said beam is inclined upwardly with respect to said box from adjacent said one end thereof at an angle of approximately 15 degrees to said longitudinal extent, whereby the beam from said light source is directed above the battery compartment at said other end thereof and against said mirror when same is in its operating position; and means located between the transparency holder and said mirror for projecting the image of the transparency on the screen, said light source, said mirror and plane of said screen being so arranged that the image of a transparency placed within said transparency holder will be projected onto said screen for unobstructed viewing from a wide range of positions near the other end of said box.

2. The device defined in claim 1 wherein said cover comprises two articulated sections, and the screen is located on the one of said sections which is adjacent to said box when in said upright position, and, when in such position, the other of said sections is disposed at an obtuse angle with respect to said screen and extends toward said other end of said box and acts additionally as a shroud to minimize the effect of ambient light.

3. The device defined in claim 1 wherein the power supply for said light source comprises rechargeable batteries in said compartment at the other end of said box and said device includes a translating device for converting alternating potential to a unidirectional potential; and circuitry supplying potential from said batteries to said light source when the alternating source is de-energized and, when said alternating potential source is energized, conducting unidirectional potential from said translating device to said light source for energizing same and also to said batteries for recharging them.

4. The device defined in claim 1 wherein said transparency holder includes an open-ended channel extending between the sides of said box, and said box has openings in the sides thereof aligned with said channel, whereby transparencies can be moved through one side of said box into position in said transparency holder and thence on through said box and out the other side.

5. A portable slide projector comprising: an elongated box having bottom, front, rear and side walls and a cover pivotally mounted on the rear wall thereof, said cover having a screen on the inside surface thereof, said screen being movable to a position in which the screen is substantially perpendicular to the longitudinal extent of said box; a light source in said box adjacent said rear wall; a transparency holder in said box located forwardly of said light source and optical means directing a beam from said source through said transparency toward the front wall of said box; said light source, said transparency holder and said optical means being mounted within a substantially tubular casing, said casing being nonmovably mounted within said box and being inclined upwardly from said rear wall thereof so that the beam from said source is directed above the top edge of said front wall; means defining a battery compartment in said box forwardly of said transparency holder and adjacent said front wall below the top edge thereof and located below the beam from said source; a mirror located in said box between said battery compartment and said front wall and parallel with said screen when same is in said position perpendicular to the longitudinal extent of said box and means supporting said mirror for vertical sliding movement with respect to said box between a position where it lies behind said compartment to an elevated position where it is above said compartment and is above the top edge of said front wall and is optically aligned with said transparency holder and said light source; and means located between the transparency holder and said mirror for projecting the image of the transparency on the screen, said light source, mirror and plane of said screen being so arranged that the image of a transparency placed within said transparency holder will be projected onto said screen.

6. The combination of claim 5 wherein the structure securing said tubular casing to said box includes a pair of spaced plates secured to each of said side walls, the opposing edges of said plates being spaced from said side walls to define a recess; and flange means secured to said tubular casing on either side thereof and slidably received in each of said recesses, said flange means resting on the upper edges of said plates to hold said tubular casing in predetermined position in said box.

References Cited in the file of this patent

UNITED STATES PATENTS

| | | |
|---|---|---|
| 1,696,831 | Baker | Dec. 25, 1928 |
| 1,952,522 | Warmisham | Mar. 27, 1934 |
| 2,022,903 | Thomas | Dec. 3, 1935 |
| 2,234,227 | Below et al. | Mar. 11, 1941 |
| 2,238,762 | Whitaker | Apr. 15, 1941 |
| 2,525,552 | Kingston | Oct. 10, 1950 |
| 2,634,652 | Barth | Apr. 14, 1953 |
| 2,727,135 | Berg et al. | Dec. 13, 1955 |
| 2,847,902 | D'Incerti | Aug. 19, 1958 |
| 2,865,249 | Zweidinger et al. | Dec. 23, 1958 |

FOREIGN PATENTS

| | | |
|---|---|---|
| 211,169 | Great Britain | Oct. 16, 1924 |